US008228362B2

(12) United States Patent
Chao et al.

(10) Patent No.: US 8,228,362 B2
(45) Date of Patent: Jul. 24, 2012

(54) IMAGE CAPTURING DEVICE AND IMAGE DELIVERY METHOD

(75) Inventors: Wei-Min Chao, Jhongli (TW); Chun-Chiao Wang, Taipei (TW)

(73) Assignee: Quanta Computer, Inc., Kuei Shan Hsiang, Tao Yuan Shien (TW)

( * ) Notice: Subject to any disclaimer, the term of this patent is extended or adjusted under 35 U.S.C. 154(b) by 705 days.

(21) Appl. No.: 12/483,467

(22) Filed: Jun. 12, 2009

(65) Prior Publication Data

US 2010/0149304 A1 Jun. 17, 2010

(30) Foreign Application Priority Data

Dec. 16, 2008 (TW) ................................ 97149014 A (51) Int. Cl.
*H04N 7/15* (2006.01)
*G09G 3/36* (2006.01)

(52) U.S. Cl. ..................... 348/14.08; 345/102; 345/565; 345/629; 348/14.01; 348/14.07; 348/211.2; 348/462; 348/565; 375/240.01; 375/240.03; 375/240.12; 380/201; 386/219; 386/233; 386/326; 386/328; 386/338; 725/25; 725/61; 725/146

(58) Field of Classification Search .................. 345/102, 345/565, 629; 348/14.01, 14.07, 14.08, 211.2, 348/462, 565; 375/240.01, 240.03, 240.12; 380/201; 386/219, 224, 233, 326, 328, 338; 725/25, 61, 146

See application file for complete search history.

(56) References Cited

U.S. PATENT DOCUMENTS

| 5,909,638 | A | * | 6/1999 | Allen ............................ 725/146 |
| 5,995,150 | A | * | 11/1999 | Hsieh et al. .............. 375/240.12 |
| 6,084,910 | A | * | 7/2000 | Stanger et al. ........... 375/240.03 |
| 6,091,455 | A | * | 7/2000 | Yang ........................ 375/240.01 |
| 6,522,352 | B1 | * | 2/2003 | Strandwitz et al. ......... 348/211.2 |
| 7,010,032 | B1 | * | 3/2006 | Kikuchi et al. .......... 375/240.01 |
| 7,187,418 | B2 | * | 3/2007 | Phillips et al. ................ 348/565 |
| 7,468,738 | B2 | * | 12/2008 | Barreiro .................... 348/14.07 |

(Continued)

FOREIGN PATENT DOCUMENTS

CN 1972431 5/2007

(Continued)

OTHER PUBLICATIONS

Chinese language office action dated Mar. 3, 2011.

(Continued)

*Primary Examiner* — Gerald Gauthier
(74) *Attorney, Agent, or Firm* — Thomas|Kayden (57) ABSTRACT

The invention discloses an image capturing device and an image delivery method which is suitably applied to a video conference. The video conference is held between a local terminal and a remote terminal through a network. The device comprises a processor, a video encoder, an encryption engine and a data transmitting interface. The processor is used to process an original video signal for generating a first video signal and a second video signal. The video encoder is for receiving and compressing the first video signal. The encryption engine is for encrypting the compressed first video signal. The data transfer interface is for transmitting the compressed and encrypted first video signal and the second video signal to the local terminal. Wherein, the first video signal is transmitted to the remote terminal by the local terminal through the network and recovered by the remote terminal, and the second video signal is presented at the local terminal.

17 Claims, 6 Drawing Sheets

U.S. PATENT DOCUMENTS

| | | | |
|---|---|---|---|
| 7,684,483 B2* | 3/2010 | Coleman | 375/240.01 |
| 7,936,360 B2* | 5/2011 | Kuno | 345/629 |
| 7,995,903 B2* | 8/2011 | Kato et al. | 386/328 |
| 8,155,500 B2* | 4/2012 | Oshima et al. | 386/233 |
| 8,159,519 B2* | 4/2012 | Kurtz et al. | 348/14.01 |
| 8,170,399 B2* | 5/2012 | Shimizu et al. | 386/326 |
| 8,175,443 B2* | 5/2012 | Watanabe et al. | 386/338 |
| 2004/0119814 A1 | 6/2004 | Clisham et al. | |
| 2006/0013568 A1* | 1/2006 | Rodriguez | 386/111 |
| 2006/0088161 A1* | 4/2006 | Hashimoto et al. | 380/201 |
| 2006/0274828 A1* | 12/2006 | Siemens et al. | 375/240.01 |
| 2007/0146542 A1* | 6/2007 | Strasser | 348/462 |
| 2008/0050098 A1* | 2/2008 | Okamura et al. | 386/124 |
| 2008/0055471 A1* | 3/2008 | Tsui | 348/565 |
| 2008/0250458 A1* | 10/2008 | Roman | 725/61 |
| 2009/0289889 A1* | 11/2009 | Dove et al. | 345/102 |
| 2009/0293082 A1* | 11/2009 | Chen et al. | 725/25 |
| 2009/0293083 A1* | 11/2009 | Gordon et al. | 725/25 |
| 2010/0149304 A1* | 6/2010 | Chao et al. | 348/14.08 |

FOREIGN PATENT DOCUMENTS

CN     101277436     10/2008

OTHER PUBLICATIONS

English language translation of abstract of CN 1972431 (published May 30, 2007).
English language translation of abstract of CN 101277436 (published Oct. 1, 2008).
Taiwanese language office action dated Apr. 30, 2012.

* cited by examiner

IMAGE CAPTURING DEVICE AND IMAGE DELIVERY METHOD

CROSS-REFERENCE TO RELATED APPLICATION

This utility application claims prior to Taiwan Application Serial Number 097149014, filed Dec. 16, 2008, which is incorporated herein by reference.

BACKGROUND OF THE INVENTION

1. Field of the Invention

The present invention generally relates to an image capturing device and an image delivery method which can be suitably applied to a video conference, and more particularly, to provide an immediate image capturing device and image delivery method without adding the load of the computer.

2. Description of the Prior Art

With the development of technology, the video conference has become a popular tool used by many companies and users to transmit messages to each other via remote terminals. The image with high resolution is thus required. However, limited by the hardware structure and the network bandwidth, the transmission process is easily influenced by the computer process efficiency and the network bandwidth, so the quality of the transmitted image is always poor. Generally, the high definition (HD) image means the image with 1280*720 pixels or more. It thus becomes a heavy load for a computer when a conventional video conference device is used to capture HD frames and show them on the screen of the computer.

Figure 1:
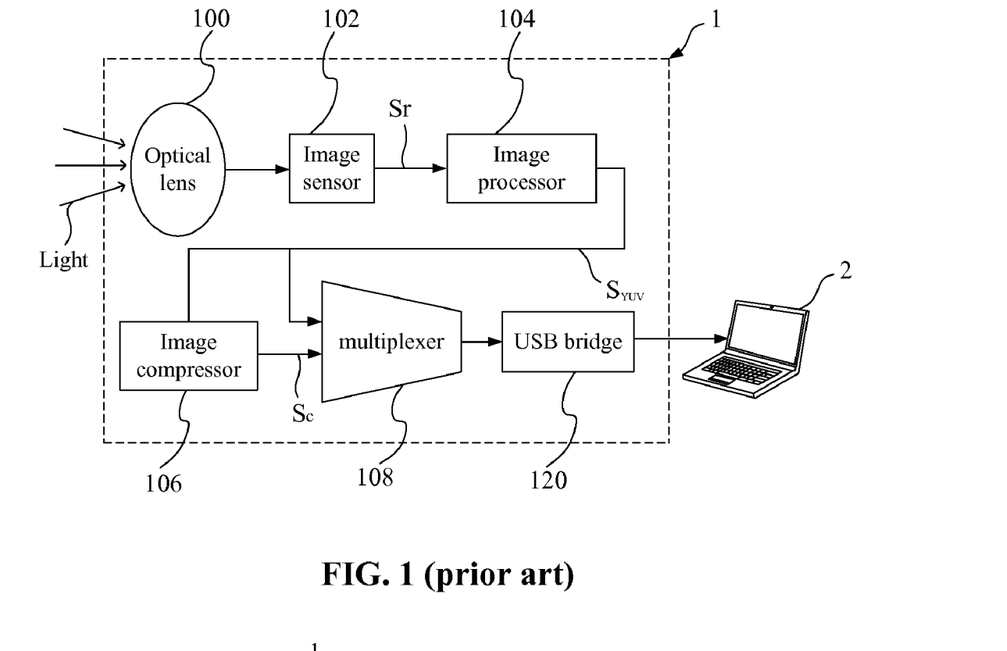
FIG. 1 is a functional block diagram illustrating the conventional image process of the camera module.

Please refer to FIG. 1. FIG. 1 is a functional block diagram illustrating the conventional image process of the camera module 1. The light is gathered to an image sensor 102 through the optical lens 100, and then the image sensor 102 transforms the light signal into an electric signal. The electric signal is a raw pixel data $S_r$. Afterward, the raw pixel data is successively processed in the image processor 104 and is transformed into a YUV color space pixel data $S_{YUV}$. The YUV pixel data can be compressed into a compression bitstream $S_c$ through the image compressor 106, the common compression standard is JPEG format. A path data is selected by the multiplexer 108 from the YUV pixel data or the compression bitstream, and the selected path data is transmitted to the USB bridge 120. The USB bridge 120 transforms the video data into the USB signal and transmits the USB signal to the computer 2. The above-mentioned structure is widely applied to a Web-Camera on a personal computer (PC) or a notebook.

However, under the USB 2.0 high-speed standard, the transmitting speed limitation to an isochronous bandwidth is 196.6 Mbps (Mega-bits per second), and the bandwidth can contain the raw data amount of 30 VGA (640*480) frames per second. However, when the frame resolution reaches 30 1280*720 frames per second, the data amount will reach 331.78 Mbps, which is obviously over the maximum bandwidth of USB 2.0. In order to transmit this amount of video signal in the conventional structure, the compression technology is used to reduce the data amount, or decrease the number of frames transmitted per second. However, if the compression technology is used, extra processes are needed and the load of the processor will become heavier. If the method of decreasing the number of frames transmitted per second is used, the user will feel that the frames shown on the screen are unsmooth.

When the conventional camera module uses the JPEG standard to compress an image, a compression rate of 5 to 10 times, namely a data amount of 66.37 Mbps to 33.18 Mbps, can be provided to be transmitted to the computer through the USB. However, if the data is transmitted via the network, the application will be limited by the bandwidth of the network. The network bandwidth can be sorted into two classes. The first class is a local-area network, and the second class is a wide-area network. The local-area network can provide an upload/download transmitting speed of 50 Mbps (100 Mbps/1 Gbps, for wire network) and 18 to 22 Mbps (for wireless network). The wide-area network can provide a transmitting speed in 30 to 50 Kbps (for modem), 300 Kbps to 1 Mbps (for asymmetric digital subscriber line, ADSL), and 2 Mbps (for fiber to the home, FTTM). Therefore, the JPEG compressing method can be used only in the local-area network, and its application range is relatively limited.

In order to make the data amount smaller and conformed to various bandwidth limitations, the advanced compression technology must be used. Presently, H.264 standard is a well-known compression technology, which is better than MPEG-2 and MJPEG. Using the H.264 technology to compress a video signal with the high resolution of 30 fps, the data transmitting speed can be reduced to 512 Kbps~2 Mbps (the quality of VHS standard to DVD standard). Thus, it can conform to the bandwidth of the wide-area network in the lower video quality or the static scenes of video conference.

Figure 2:
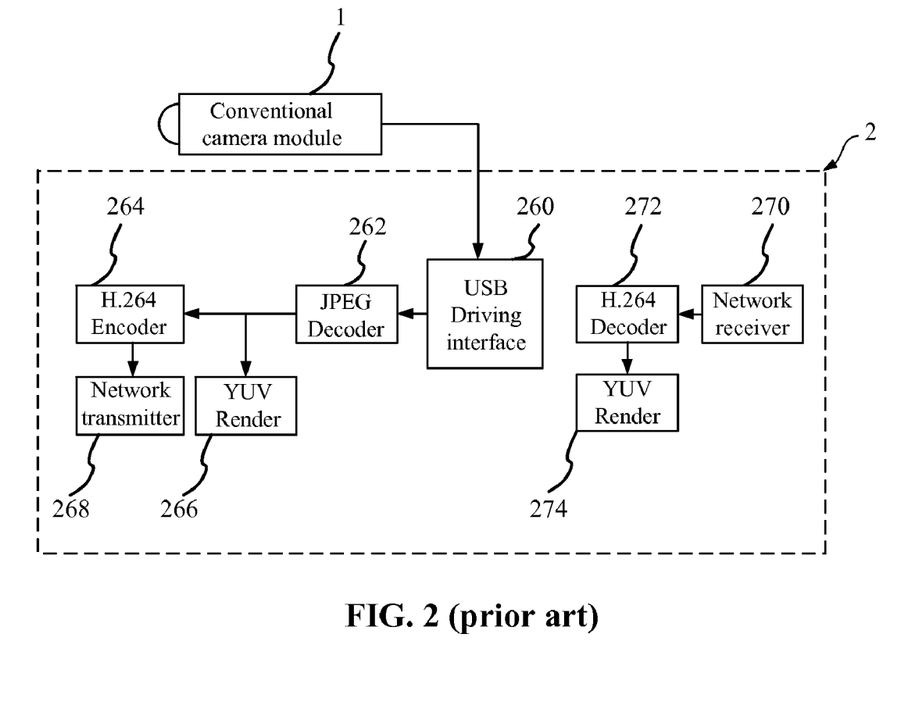
FIG. 2 is a functional block diagram of the software process in the computer under the structure of the conventional camera module.

Please refer to FIG. 2. FIG. 2 is a functional block diagram of the software process in the computer 2 under the structure of the conventional camera module 1. First, the USB driving interface 260 receives the USB packets containing JPEG bitstream from the camera module 1 (a JPEG bitstream standard under the conventional structure). Then, the JPEG decoder 262 decompresses the JPEG bitstream data to the original video data in YUV format. Next, the YUV render 266 shows the YUV data on the screen of the computer 2. After that, the H.264 encoder 264 compresses the YUV original data to a video bitstream transmitted to the network by the network transmitter 268. Afterward, the network receiver 270 receives the video bitstream via the network from a remote terminal. Finally, the video bitstream is decompressed to the original video data in YUV form by the H.264 decoder 272, and the YUV data will be shown on the screen of the computer 2 by the YUV render 274.

Under this structure, if the video conference system transmits HD frames at 30 fps, the percentages of CPU loading are shown in table 1. As shown in table 1, when the conventional capturing device for the video conference is used in a notebook with a low level CPU (e.g., Inter Core Due T2200), the total load using rate of the CPU is about 195%. If the conventional capturing device for the video conference is used in a notebook with a high level CPU (e.g., Intel Core 2 Due T7200), the total load using rate of the CPU is still over 155%.

As shown in Table 1, no matter the image is processed by the low level CPU or the high level CPU, the CPU will be seriously over-loaded. Therefore, both of the low level CPU or the high level CPU can not smoothly process the video frame data with HD frames of 30 fps captured by the conventional camera module captures.

TABLE 1

| Tasks | CPU | |
|---|---|---|
| | Intel Core Due T2200 | Intel Core 2 Due T7200 |
| JPEG decoder 262 | 25% | 10% |
| H.264 encoder 264 | >100% | >100% |

TABLE 1-continued

| | CPU | |
|---|---|---|
| Tasks | Intel Core Due T2200 | Intel Core 2 Due T7200 |
| YUV render (266) | 5% | 5% |
| H.264 decoder 272 | 60% | 35% |
| YUV render (274) | 5% | 5% |
| USB driving interface 260, Network transmitter 268, Network receiver 270 | <10% | <10% |
| Summary | >195% | >155% |

Thereby, the main scope of the present invention is to provide an image capturing device and an image delivery method to solve the problems mentioned above.

SUMMARY OF THE INVENTION

Accordingly, a scope of the present invention is to provide an image capturing device suitably applied to a video conference. The video conference is held between a local terminal and a remote terminal through a network. According to an embodiment of the invention, the image capturing device comprises a processor, a video encoder, an encryption engine, and a data transmitting interface. The processor is used for processing an original video signal to generate a first video signal and a second video signal. The video encoder is coupled to the processor and used for receiving and compressing the first video signal. The encryption engine is coupled to the video encoder and used for encrypting the compressed first video signal. The data transmitting interface is coupled to the encryption engine and the processor, and the data transmitting interface is used for transmitting the compressed and encrypted first video signal and the second video signal to the local terminal, wherein the first video signal is transmitted to the remote terminal by the local terminal through the network and recovered by the remote terminal, and the second video signal is presented at the local terminal.

Another scope of the present invention is to provide an image delivery method which is suitably applied to a video conference, and the video conference is held between a local terminal and a remote terminal through a network. According to an embodiment, the image delivery method comprises the steps of: providing an original video signal; processing the original video signal to generate a first video signal and a second video signal; receiving and compressing the first video signal; encrypting the compressed first video signal; transmitting the compressed and encrypted first video signal and the second video signal to the local terminal; showing the second video signal at the local terminal; and transmitting the first video signal from the local terminal to the remote terminal through the network, wherein the first video signal is recovered by the remote terminal.

To sum up, the image capturing device and the image delivery method of the invention can achieve a goal of transmitting high definition images in real-time. The original video signal in the invention is processed in two processing paths, and the video signal is compressed and encrypted in the image capturing device. Therefore, the processing load of the computer can be reduced so that the high definition images can be smoothly transmitted in the limited bandwidth. In short, the invention has advantages of real-tameness, high quality, smooth video.

The objective of the present invention will no doubt become obvious to those of ordinary skill in the art after reading the following detailed description of the preferred embodiment, which is illustrated in the various figures and drawings.

DETAILED DESCRIPTION OF THE INVENTION

Figure 3:
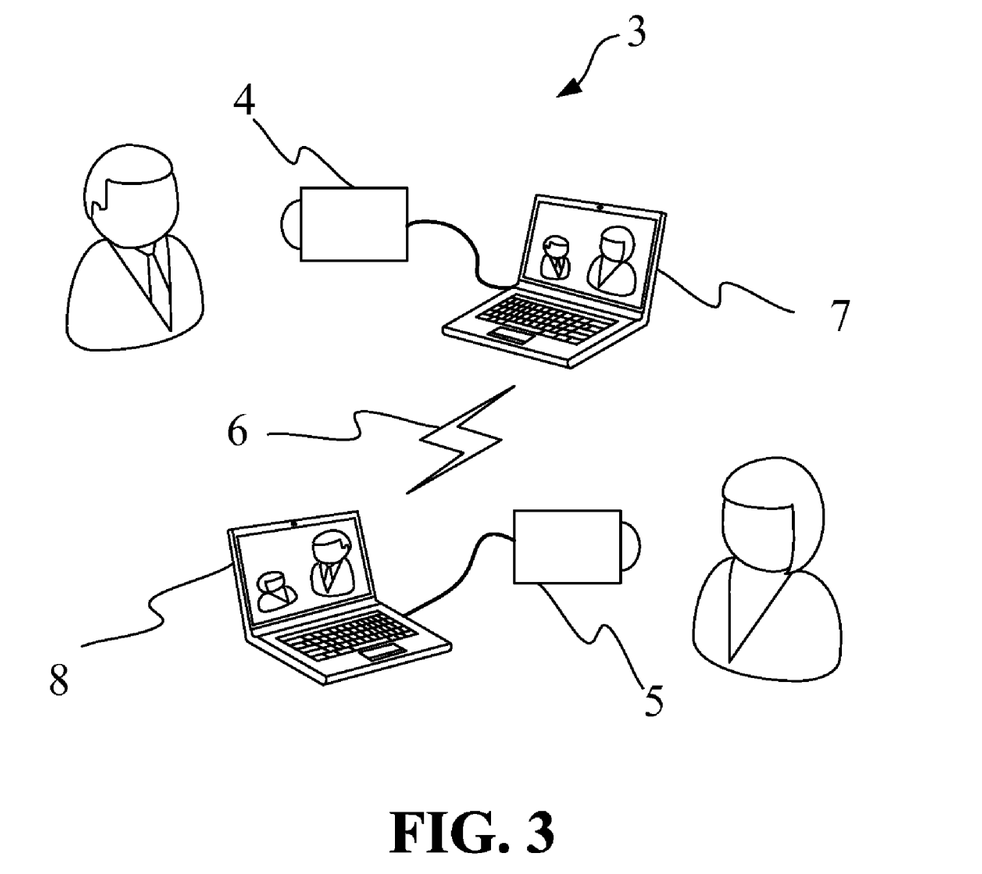
FIG. 3 is a schematic diagram illustrating the video conference system of an embodiment of the invention.

Please refer to FIG. 3. FIG. 3 is a schematic diagram illustrating the video conference system 3 of an embodiment of the invention. The video conference system is held between a local terminal 7 and a remote terminal 8 through a network 6. In the embodiment, the local terminal 7 and the remote terminal 8 can be a notebook coupled to image capturing device (4, 5) respectively.

Figure 4:
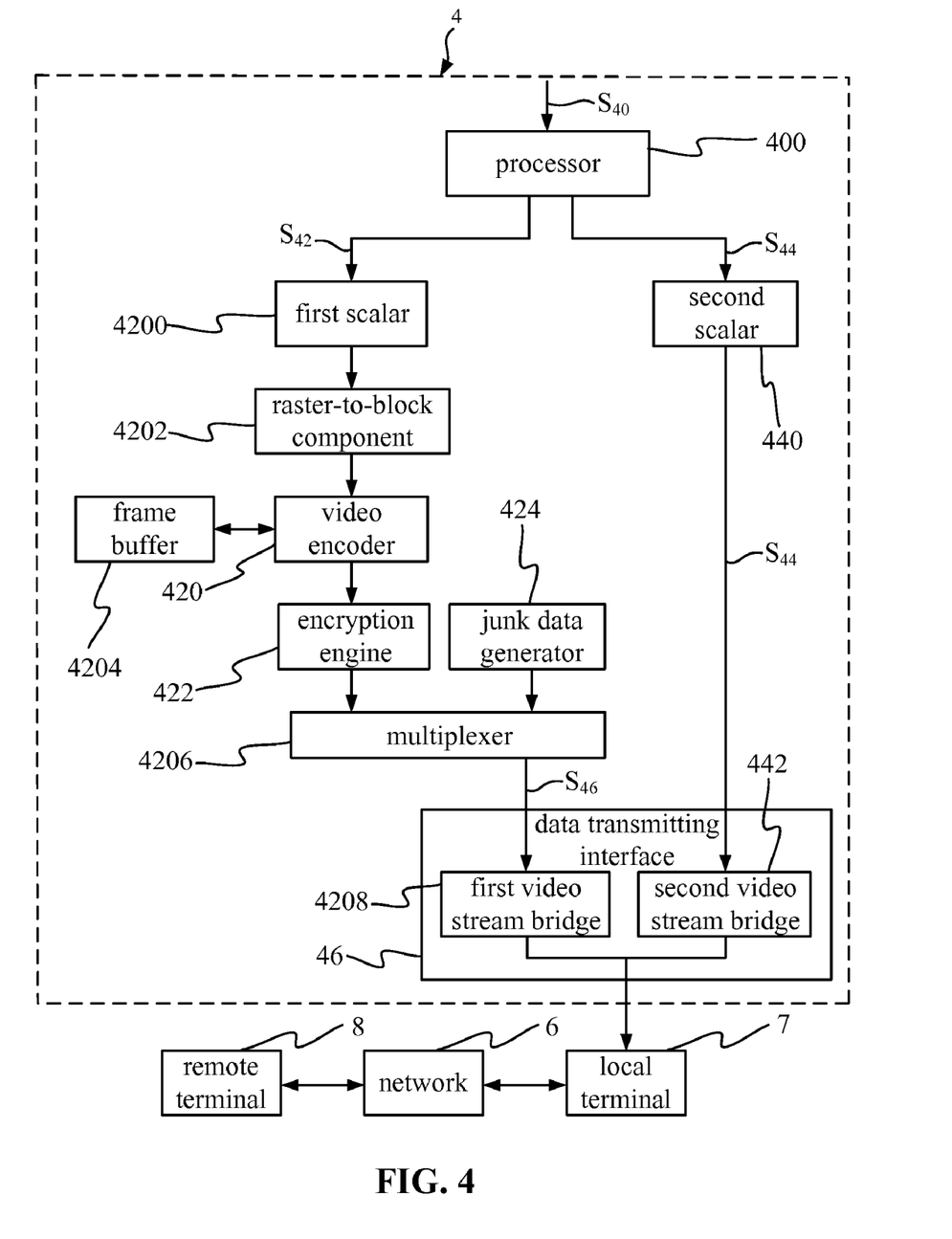
FIG. 4 is a functional block diagram illustrating the image capturing device of the embodiment in FIG. 3.

Please refer to FIG. 4. FIG. 4 is a functional block diagram illustrating the image capturing device 4 of the embodiment in FIG. 3. Please note that the function block of the image capturing device 5 can refer to FIG. 4. The image capturing device 4 of the invention comprises a processor 400, a video encoder 420, an encryption engine 422, and a data transmitting interface 46. The processor 400 is used for processing an original bayer raw signal $S_{40}$ to generate a first video signal $S_{42}$ and a second video signal $S_{44}$. The first video signal $S_{42}$ and the second video signal $S_{44}$ could be a YUV video data. Wherein, the original bayer raw signal $S_{40}$ is that after the light is concentrated on the image sensor of the image capturing device 4 through the optical lens group, the image sensor transforms the light into the electric signal. Namely, the electric signal is the original bayer raw signal $S_{40}$.

It should be noted that when the image capturing device 4 of the invention processes the first video signal $S_{42}$, the image capturing device 4 can further comprise a first scalar 4200, a raster-to-block component 4202, and a frame buffer 4204. The first scalar 4200 is coupled to the processor 400 for scaling the first video signal $S_{42}$. The raster-to-block component is coupled between the first scalar 4200 and the video encoder 420. The frame buffer 4204 is coupled to the video encoder 420. Wherein, after the pixel data is transmitted to the video encoder 420 through the raster-to-block component 4202, the video encoder 420 can compress the first video signal $S_{42}$ to a video bitstream. Since the video encoder 420 can remove the temporal and spatial redundancy, the fame buffer 4204 is needed to save the reconstructed fame pixel data.

The video encoder 420 is used for receiving and compressing the first video signal $S_{42}$. In practical applications, the video encoder 420 can use a MPEG-4 standard or a H.264 standard to compress the first video signal $S_{42}$. The encryption engine 422 is coupled to the video encoder 420 for encrypting the compressed first video signal $S_{42}$.

It should be noted that the image capturing device 4 further comprises a junk data generator 424 and a multiplexer 4206. In the embodiment, the multiplexer 4206 can be a MPEG-2 multiplexer, but not limited to it. The junk data generator 424 is used for generating a junk data, and the junk data generator 424 can set the outputting quantity of the junk data. The multiplexer 4206 is coupled among the encryption engine 422, the data transmitting interface 46, and the junk data generator 424, and the multiplexer 4206 is used for generating a mixed signal by mixing the junk data and first video signal $S_{42}$ and transmitting a MPEG-2 video bitstream $S_{46}$ to the data transmitting interface 46. The junk data generator 424 is used for decreasing the delay time of the video signal caused by the buffer of the local terminal 7 after the video signal is transmitted to the local terminal 7, so that the video conference can be processed more smoothly.

Additionally, the image capturing device 4 of the invention can further comprise a second scalar 440 coupled between the processor 400 and the data transmitting interface 46, and the image capturing device 4 is used for adjusting to the second video signal $S_{44}$ transmitted from the processor 400. Please note that if the data transmitting interface 46 has a bandwidth limited device, the resolution of the video signal can be scaled by the first scalar 4200 and the second scalar 440.

In an embodiment, the data transmitting interface 46 can be a universal serial bus (USB) interface. As shown in FIG. 4, the USB interface includes a first video stream bridge 4208 and a second video stream bridge 442. The first video stream bridge 4208 is coupled to the encryption engine 422, and the second video stream bridge 442 is coupled to the second scalar 440. By working together with data processing, the first video stream bridge 4208 and the second video stream bridge 442 packet the video bitstream $S_{46}$ outputted by the multiplexer 4206 and the second video signal $S_{44}$ outputted by the second scalar 440 into the USB packets, and then transmit it to the local terminal 7.

Figure 5:
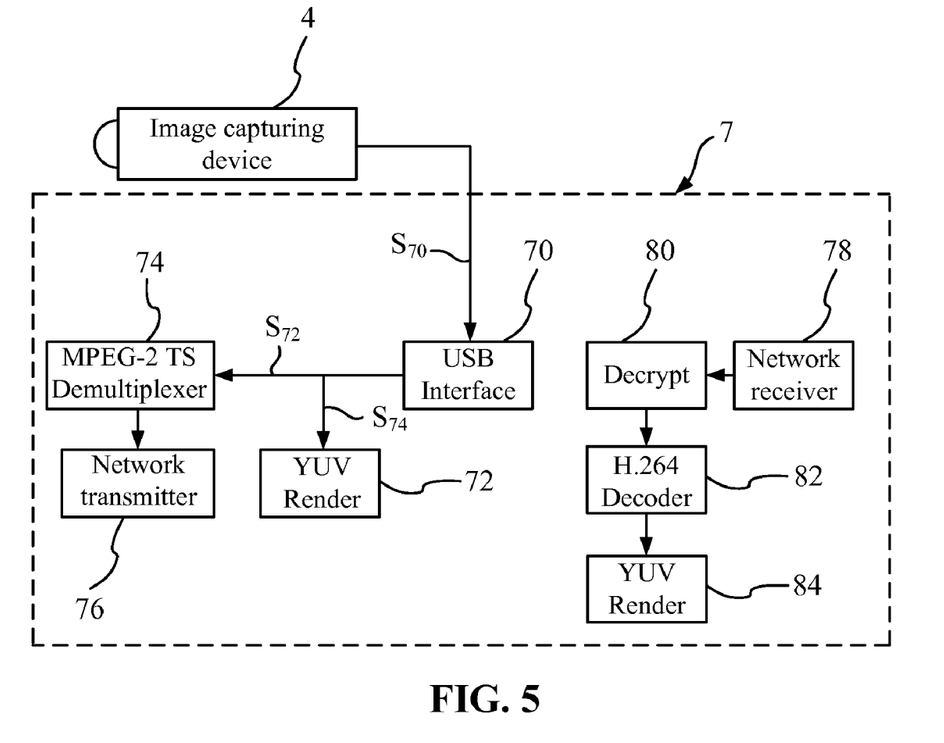
FIG. 5 is a functional block diagram illustrating the software process in the local terminal in FIG. 3.

Please refer to FIG. 5. FIG. 5 is a functional block diagram illustrating the software process in the local terminal in FIG. 3. Please note that the software process in the remote terminal 8 can refer to FIG. 5. First, the USB interface 70 decompresses the packet data $S_{70}$ to the original data comprising the video bitstream $S_{72}$ of the MPEG-2 standard and second video signal $S_{74}$ of the YUV standard from the image capturing device 4 transmitted. Then, the second video signal $S_{74}$ is shown at the monitor of the local terminal 7 by the YUV render 72 to regard as the preview frames of the local terminal. Specifically, the MPEG-2 TS demultiplexer 74 is used for retrieving the compressed and encrypted first video signal from the MPEG-2 video bitstream $S_{72}$, but the junk data will be discarded in the MPEG-2 video bitstream $S_{72}$. Afterward, the retrieved first video signal is transmitted to the remote terminal 8 by the network transmitter 76 through the network 6, which offers the remote terminal 8 viewable the fames of the local terminal.

After the network receiver 78 receives the video bitstream (e.g., the first video signal) from the remote terminal 8, the decrypt 80 will decrypt the video bitstream. Then, the H.264 decoder 82 decompresses the video bitstream to the original video data of the YUV standard. Afterward, the YUV render 84 will show the decompressed frames on the screen of the remote terminal 8.

In the invention, when 30 HD frames per second (30 fps) are transmitted, the software operation calculates at the low level CPU (T2200) and the high level CPU (T7200) as shown in table 2. It can be known according to table 2, whether a low level CPU or a high level CPU can process 30 fps in the video conference.

TABLE 2

|  | CPUs | |
| --- | --- | --- |
| Tasks | Intel Core Due T2200 | Intel Core 2 Due T7200 |
| YUV render 72 | 5% | 5% |
| H.264 decoder 82 | 60% | 35% |
| YUV render 84 | 5% | 5% |
| Others (70, 74, 76, 78, 80) | <10% | <10% |
| Summary | <80% | <55% |

Figure 6:
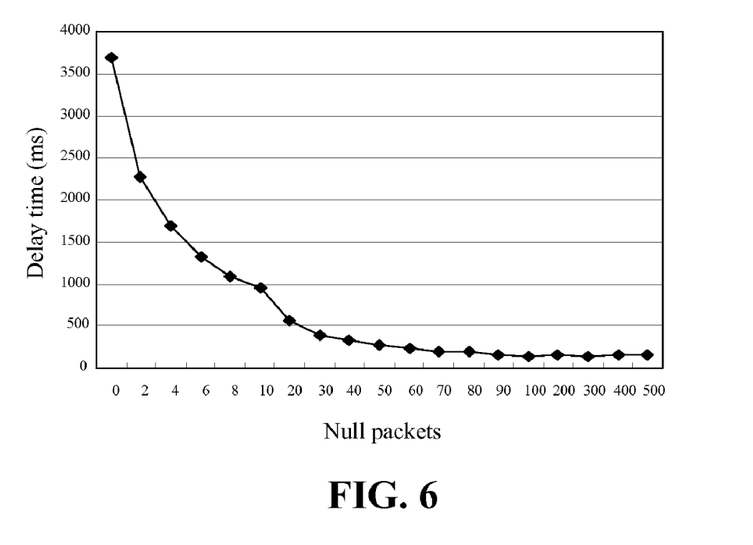
FIG. 6 is a diagram of the delay time vs. the junk data packet.

Please refer to FIG. 6. FIG. 6 is a diagram of the delay time vs. the junk data packet. The measurement of the delay time is started from the light is transmitted into the camera of the local terminal until the video signal is encoded in the H.264 encoder and shown on the screen of the remote terminal. Wherein, the delay factor of the network is regarded as an ideal condition (the delay time is 0 ms). As shown in FIG. 6, when the junk data increases, the delay time caused by the buffer of the USB interface is decreased accordingly. When 90 junk data packets (each packet has 188 bytes) are mixed, the total delay time can be decreased to 165 ms.

Figure 7A:
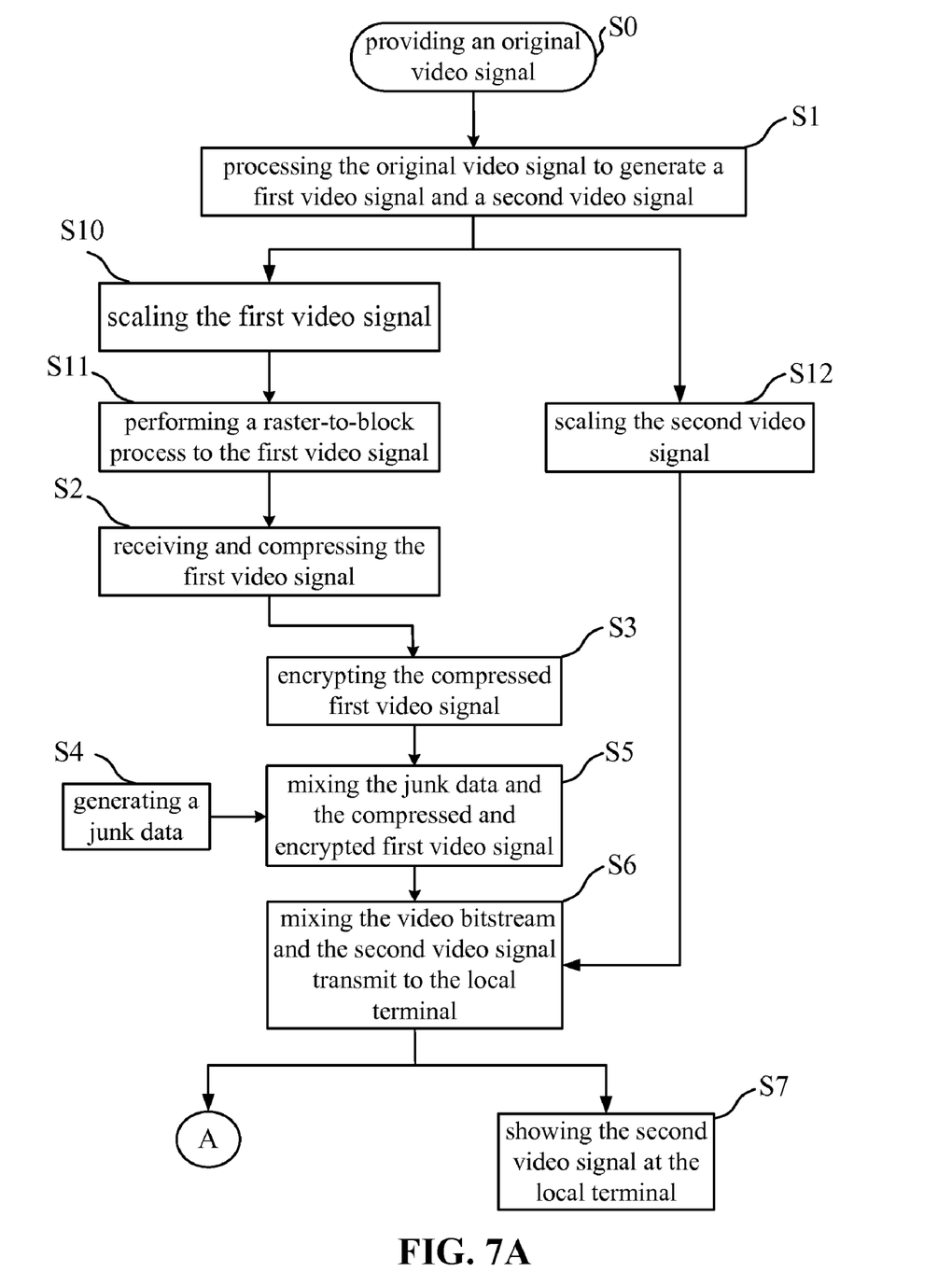
FIG. 7A and FIG. 7B are flow charts illustrating the image delivery method of another embodiment of the invention.
Figure 7B:
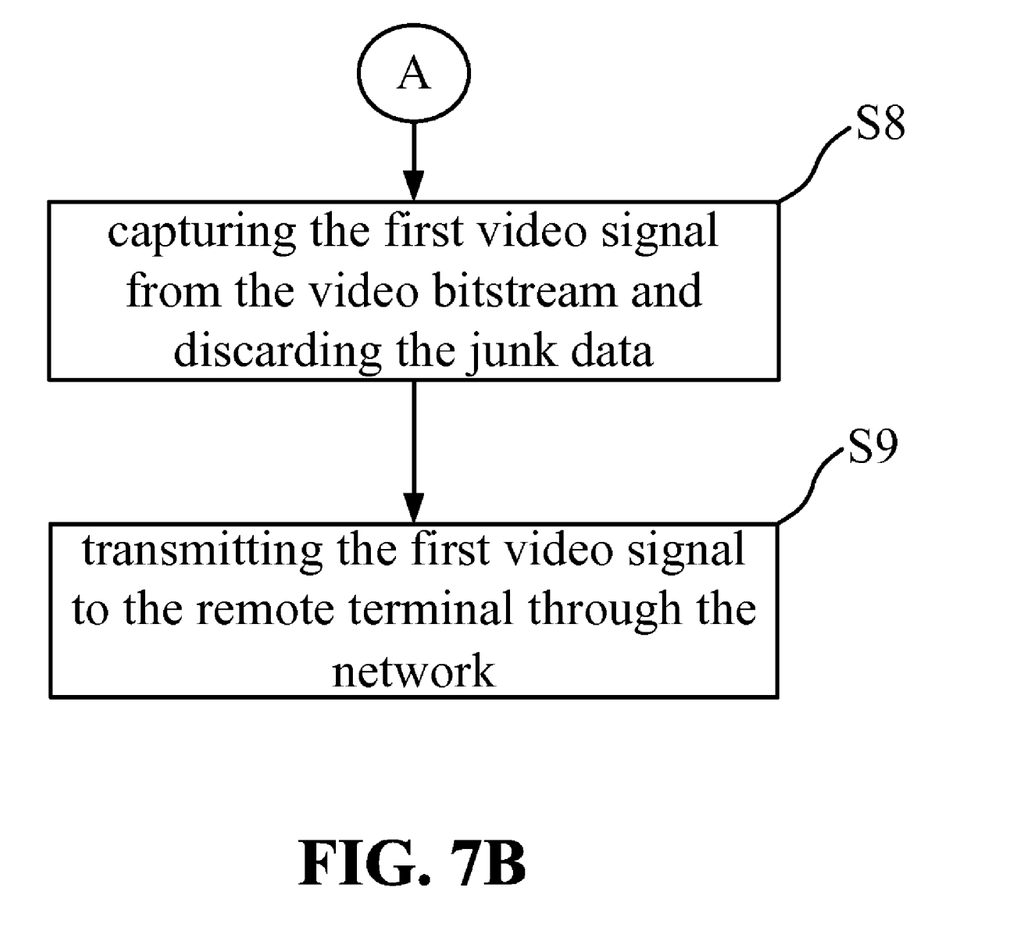

Please refer to FIG. 7A, FIG. 7B, and FIG. 3. FIG. 7A and FIG. 7B are flow charts illustrating the image delivery method of another embodiment of the invention. The image delivery method of the invention is suitably applied to a video conference held between a local terminal 7 and a remote terminal 8 through a network. The method comprises the steps of:

Step S0 is performed to provide an original video signal. The original video signal is provided from the image capturing device (4, 5) in FIG. 3, the image capturing device 4 is taken as an example here.

Step S1 is performed to process the original video signal to generate a first video signal and a second video signal in the image capturing device 4.

For the first video signal, steps S10 and S11 are performed to scale the first video signal, and then perform a raster-to-block process to the first video signal. Afterward, steps S2 and S3 are performed to receive and compress the first video signal, and then encrypt the compressed first video signal.

Please note that the image delivery method of the invention can further perform step S4 to generate a junk data. Next, step S5 is performed to mix the junk data and the compressed and encrypted first video signal to make a video bitstream, such as a MPEG-2 video bitstream. Please refer to the previous explanation related to the junk data.

After step S1 is performed, for the second video signal, step S12 is performed to scale the second video signal. After the first video signal and the second video signal are processed, step S6 is performed to mix the video bitstream and the second video signal (e.g., a mixed USB data packet), and then the mixed signal will be transmitted to the local terminal 7.

Afterward, for the second video signal, step S7 is performed to capture the second video signal and show the second video signal at the local terminal as a preview frame of the local terminal. For the first video signal, step S8 is performed to capture the first video signal from the video bitstream and remove the junk data. Next, step S9 is performed to transmit the first video signal from the local terminal to the remote terminal through the network, and the first video signal is recovered by the remote terminal so that the frames of the local terminal can be watched at the remote terminal.

In the embodiment, the image capturing method of the invention can further receive a compressed third video signal transmitted from the remote terminal at the local terminal, and then decompress the third video signal and show the decompressed third video signal at the local terminal.

In practical applications, the second video signal can be shown on the first region of the screen of the local terminal, and the compressed third video signal can be shown on the second region of the screen, the images from the local terminal is showed by the second video signal, and the images from the remote terminal is showed by the third video signal. Therefore, the screen of the local terminal shows the frames from the local camera and the capturing frames of the remote terminal transmitted through the network. Similarly, a video image of two signals is also shown on the screen of the remote terminal.

Compared to the prior art, the invention can reduce various bandwidth limitations and smoothly transmit video conference frames at the HD (1280*720) frames of 30 fps by processing the original video signal in two processing paths, and then the video signal is compressed and encrypted in the image capturing device. Thereby, when a personal computer or a notebook transmits real-time video, the computer will not be overloaded to result in a long delay. The image capturing device and delivery method of the invention can keep the normal CPU loading in the computer, and the delay time of frames can be effectively reduced.

Although the present invention has been illustrated and described with reference to the preferred embodiment thereof, it should be understood that it is in no way limited to the details of such embodiment but is capable of numerous modifications within the scope of the appended claims.

What is claimed is:

1. An image capturing device applied to a video conference, the video conference held between a local terminal and a remote terminal through a network, the image capturing device comprising:
   a processor for processing an original video signal to generate a first video signal and a second video signal;
   a video encoder, coupled to the processor, for receiving and compressing the first video signal;
   an encryption engine, coupled to the video encoder, for encrypting the compressed first video signal; and
   a data transmitting interface, coupled to the encryption engine and the processor, for transmitting the compressed and encrypted first video signal and the second video signal to the local terminal;
   wherein the first video signal is transmitted to the remote terminal by the local terminal through the network and recovered by the remote terminal, and the second video signal is presented at the local terminal.

2. The image capturing device of claim 1, further comprising:
   a junk data generator for generating a junk data; and
   a multiplexer, coupled between the encryption engine and the data transmitting interface and coupled to the junk data generator, for generating a mixed signal by mixing the junk data and the first video signal and transmitting the mixed signal to the data transmitting interface.

3. The image capturing device of claim 1, further comprising:
   a first scalar, coupled between the processor and the video encoder, for scaling the first video signal.

4. The image capturing device of claim 3, further comprising:
   a raster-to-block component, coupled between the first scalar and the video encoder.

5. The image capturing device of claim 1, further comprising:
   a second scalar, coupled between the processor and the data transmitting interface, for scaling the second video signal.

6. The image capturing device of claim 1, further comprising:
   a frame buffer, coupled to the video encoder.

7. The image capturing device of claim 1, wherein the data transmitting interface is a universal serial bus (USB) interface.

8. The image capturing device of claim 7, wherein the USB interface comprises a first video stream bridge and a second video stream bridge, the first video stream bridge is coupled to the encryption engine, and the second video stream bridge is coupled to the processor.

9. The image capturing device of claim 1, wherein the video encoder conforms a MPEG-4 standard or a H.264 standard.

10. An image delivery method applied to a video conference, the video conference held between a local terminal and a remote terminal through a network, the method comprising the steps of:
    providing an original video signal;
    processing the original video signal to generate a first video signal and a second video signal;
    receiving and compressing the first video signal;
    encrypting the compressed first video signal;
    transmitting the compressed and encrypted first video signal and the second video signal to the local terminal;
    showing the second video signal at the local terminal; and
    transmitting the first video signal from the local terminal to the remote terminal through the network, wherein the first video signal is recovered by the remote terminal.

11. The method of claim 10, further comprising the steps of:
    generating a junk data; and
    mixing the junk data and the compressed and encrypted first video signal.

12. The method of claim 10, wherein before the first video signal is compressed, and the method further comprises the step of:
    scaling the first video signal.

13. The method of claim 12, wherein after the first video signal is scaled, the method further comprises the step of:
    performing a raster-to-block process to the first video signal.

14. The method of claim 10, wherein before the second video signal is transmitted to the local terminal, and the method further comprises the step of:
    scaling the second video signal.

15. The method of claim 10, further comprising the steps of:
    receiving a compressed third video signal from the remote terminal at the local terminal; and
    decompressing the third video signal and showing the decompressed third video signal at the local terminal.

16. The method of claim 15, wherein the second video signal is shown on a first region of a screen of the local terminal, and the decompressed third video signal is presented on the second region of the screen, the image from the local terminal is shown by the second video signal, and the image from the remote terminal is shown by the third video signal.

17. The method of claim 10, wherein a MPEG-4 standard or a H.264 standard is used to compress the first video signal.

* * * * *